United States Patent
Lee et al.

(10) Patent No.: US 7,340,554 B2
(45) Date of Patent: Mar. 4, 2008

(54) USB HOST CONTROLLER WITH DMA CAPABILITY

(75) Inventors: Chee Ee Lee, Singapore (SG); Constantin Socol, Singapore (SG); Jerome Tjia, Singapore (SG)

(73) Assignee: NXP B.V., Eindhoven (NL)

( * ) Notice: Subject to any disclaimer, the term of this patent is extended or adjusted under 35 U.S.C. 154(b) by 125 days.

(21) Appl. No.: 10/556,453

(22) PCT Filed: May 12, 2004

(86) PCT No.: PCT/IB2004/050643

§ 371 (c)(1), (2), (4) Date: Nov. 10, 2005

(87) PCT Pub. No.: WO2004/102407

PCT Pub. Date: Nov. 25, 2004

(65) Prior Publication Data

US 2007/0028011 A1 Feb. 1, 2007

(30) Foreign Application Priority Data

May 15, 2003 (SG) ............... PCT/SG2003/000129

(51) Int. Cl.
*G06F 13/16* (2006.01)

(52) U.S. Cl. ............................ 710/313; 710/25; 710/308
(58) Field of Classification Search ............. 710/25, 710/308, 313
See application file for complete search history.

(56) References Cited

U.S. PATENT DOCUMENTS

| | | | |
|---|---|---|---|
| 6,266,715 B1* | 7/2001 | Loyer et al. | 710/22 |
| 6,742,076 B2* | 5/2004 | Wang et al. | 710/314 |
| 2002/0062408 A1* | 5/2002 | Jahnke et al. | 710/22 |
| 2002/0178310 A1* | 11/2002 | Nozaki | 710/240 |
| 2003/0084212 A1* | 5/2003 | Butterfield | 710/22 |
| 2003/0172224 A1* | 9/2003 | Gulick et al. | 711/1 |

\* cited by examiner

*Primary Examiner*—Glenn A. Auve

(57) ABSTRACT

An embedded host controller, for use in a USB system comprising a processor and an associated system memory, comprises a DMA controller, and the host controller is adapted such that, in order to retrieve data from the associated system memory, a starting address and block length are sent to the DMA controller, and the DMA controller is adapted such that, on receipt of a starting address and block length sent from the host controller, it retrieves the indicated data from the associated system memory. This has the advantage that the embedded host controller can be used with different host microprocessors, without assuming that PCI functionality is available.

13 Claims, 2 Drawing Sheets

USB HOST CONTROLLER WITH DMA CAPABILITY

This invention relates to a host controller, and in particular to a host controller for use in a bus communications system.

The Universal Serial Bus (USB) specifications define a bus communications system, in which a USB host can be connected to multiple USB devices, in order to allow convenient data transfer between the USB host and the USB devices. The invention relates more specifically to an Enhanced Host Controller Interface (EHCI) that acts as the interface for a host controller in a device which is acting as a USB host.

USB hosts are typically personal computers (PCs) or similar devices. That is, it is mainly PCs which are provided with the functionality to allow them to act as a USB host. This means that a conventional EHCI operates in a situation in which there is a Peripheral Component Interconnect (PCI) standard bus, providing specific functionality, which is used by the EHCI. For example, the EHCI uses the bus mastering functionality of the PCI to retrieve the data that is to be transmitted.

However, it is becoming recognized that it would be useful to allow other devices, for example such as mobile phones, to act as USB hosts. These other devices typically do not have a PCI bus, and so it is not possible for the EHCI to take advantage of the PCI functionality.

Moreover, the host microprocessor in such devices typically has less processing power than the microprocessor in a PC.

It would therefore be advantageous to provide a host controller for use in embedded applications, in which the PCI functionality is not assumed, and in which the demands on the host microprocessor are reduced.

According to a first aspect of the present invention, there is provided an embedded host controller, for use in a USB system comprising a processor and an associated system memory, wherein the host controller comprises a DMA controller, and the host controller is adapted such that, in order to retrieve data from the associated system memory, a starting address and block length are sent to the DMA controller, and the DMA controller is adapted such that, on receipt of a starting address and block length sent from the host controller, it retrieves the indicated data from the associated system memory.

This has the advantage that the embedded host controller can be used with different host microprocessors, without assuming that PCI functionality is available.

In a first preferred embodiment of the invention, wherein the host controller allows bus arbitration, the DMA controller is adapted to send a bus request to the processor, and to retrieve data from the associated system memory only when bus access has been granted.

In a second preferred embodiment of the invention, wherein the host controller does not allow bus arbitration, the DMA controller is adapted to send a signal to the processor while it is retrieving data from the associated system memory, thereby preventing the processor from simultaneously attempting to access the associated system memory.

According to a second aspect of the present invention, there is provided a USB host, including a host controller in accordance with the first aspect of the invention.

The invention will be described with reference to the accompanying drawings in which.

Figure 1:
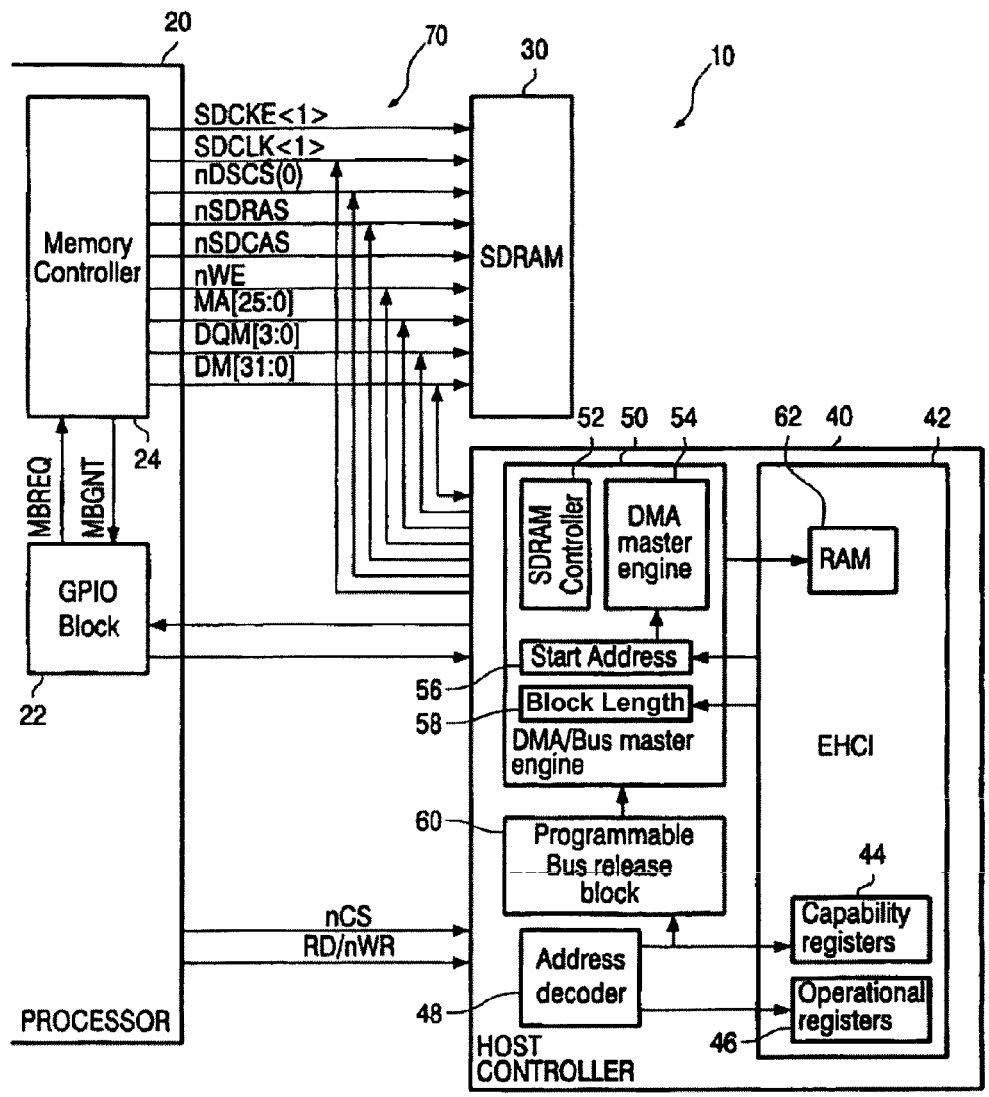
FIG. 1 is a block schematic diagram of a system including a first embedded host controller in accordance with the present invention.

FIG. 1 is a block schematic diagram of a part of a USB host 10, in accordance with the present invention. The term USB host is used herein to mean a device which operates as a host in a system operating in accordance with, for example, the USB 2.0 specification. That is, the USB host can be connected by means of a USB bus to one or more USB devices, and the USB host controls the communication of data to and from the USB devices.

The present invention is applicable to all USB hosts, but it is particularly applicable to situations where the USB host is not a personal computer, and so it does not have a Peripheral Component Interconnect (PCI) bus, and may not have an especially powerful processor.

The USB host 10 has a host processor 20, a system memory 30, and a host controller 40.

In this preferred embodiment of the invention, the processor 20 is an Intel® PXA210 or PXA250 processor, and as such is well known to the person skilled in the art. Other processors having similar functionality can of course also be used. The processor 20 includes a General Purpose Input-Output (GPIO) block 22, and a memory controller 24. Other features and functions of the processor 20 will not be described further herein, except insofar as they are relevant to an understanding of the present invention.

The memory 30 is a SDRAM bank, which again, is well known to the person skilled in the art.

As is conventional, the host controller, or embedded EHCI host, 40 is adapted to retrieve data which is prepared by the processor 20 in a suitable format, and to transmit the data over the bus interface. In USB communications, there are two categories of data transfer, namely asynchronous transfer and periodic transfer. Control and bulk data are transmitted using asynchronous transfer, and ISO and interrupt data are transmitted using periodic transfer. The Enhanced Host Controller Interface (EHCI) uses a Queue Transaction Descriptor (qTD) data structure for asynchronous transfer, and an Isochronous Transaction Descriptor (iTD) data structure for periodic transfer.

The processor 20 prepares the data in the appropriate structure, and stores it in the system memory 30, and the host controller 40 must then retrieve the data from the system memory 30.

FIG. 1 shows in more detail the structure of the host controller 40. The host controller 40 includes an EHCI core 42, which is generally conventional, and includes capability registers 44 and operational registers 46, but will not be described further herein. The host controller 40 is connected to an address decoder 48, which is also generally conventional.

The internal capability registers 44 and operational registers 46 of the EHCI core 42 can be implemented as a direct input/output map, and a CS signal from the processor 20 can be used to select the embedded host controller.

In accordance with the invention, the host controller 40 includes a DMA/bus master engine 50, which is adapted for the case where, as here, the processor 20 allows for some form of bus arbitration.

The EHCI core 42 of the host controller 40 uses the same transfer descriptors which are used in the conventional EHCI host controller, which retrieves data by mastering a PCI bus, and so the additional effort required to produce the EHCI core software is reduced.

The DMA/bus master engine 50 includes a SDRAM controller 52 and a direct memory access (DMA) master engine 54, and can be programmed with a start address 56 and a block length 58 by the EHCI core 42.

The DMA/bus master engine 50 can also receive inputs from a programmable bus release block 60.

The host controller 40 further includes a RAM 62.

The host controller 40 can access the processor 20 through direct inputs or outputs to or from the GPIO block 22, and can access the embedded system memory bus 70.

When the host controller 40 is to retrieve the data from the system memory 30, the processor 20 must release the bus 70, allowing the host controller 40 to access the system memory 30.

Thus, when the host controller 40 initializes a transfer of data, a starting address and block length are sent from the core logic 42 to the DMA controller 54, which issues a bus request to the GPIO block 22. The GPIO block 22 sends a memory bus request (MBREQ) signal to the memory controller 24. When access is granted, a memory bus grant (MBGNT) signal is sent from the memory controller 24 to the GPIO block 22, which sends a corresponding signal to the host controller 40. All of the data, address and control signal lines of the bus 70 are then tri-stated, such that the host controller 40 can access the memory 30. Data can then be transferred from the system memory 30 to the host controller 40 without requiring further intervention from the processor 20.

Specifically, the DMA controller 54 bursts a block of data from the system memory 30 to the RAM 62, from which it can be transmitted over the USB bus interface.

The SDRAM controller 52 provides refresh capability during the time when the bus 70 is granted to the host controller 40. That is, if the burst cycle/length is longer than the refresh period of the SDRAM 30, the SDRAM controller 52 performs the refresh function. This means that the burst length need not be restricted to the refresh period. Without the SDRAM controller 52 to perform the refresh function, it would be necessary to transfer bus utilization back to the processor 20 for it to perform the refresh function, and then back to the host controller 40 to resume data transfer.

The programmable bus release block 60 can be programmed by the processor 20 with a number of clock cycles, and this sets the number of clock cycles for which the host controller 40 can occupy the bus 70 following a single memory bus access grant. Thus, the programmed number of clock cycles indicates a maximum duration of a bus access. Once this programmed number of clock cycles has expired, the host controller 40, by means of the DMA controller 54, performs a last dataword transfer, and then releases the bus 70 by means of a de-assertion bus request.

This prevents the host controller from occupying the bus 70 for so long that it prevents the processor 20 from performing critical tasks, and therefore allows a better balance of bus utilization between the processor 20 and host controller 40.

Figure 2:
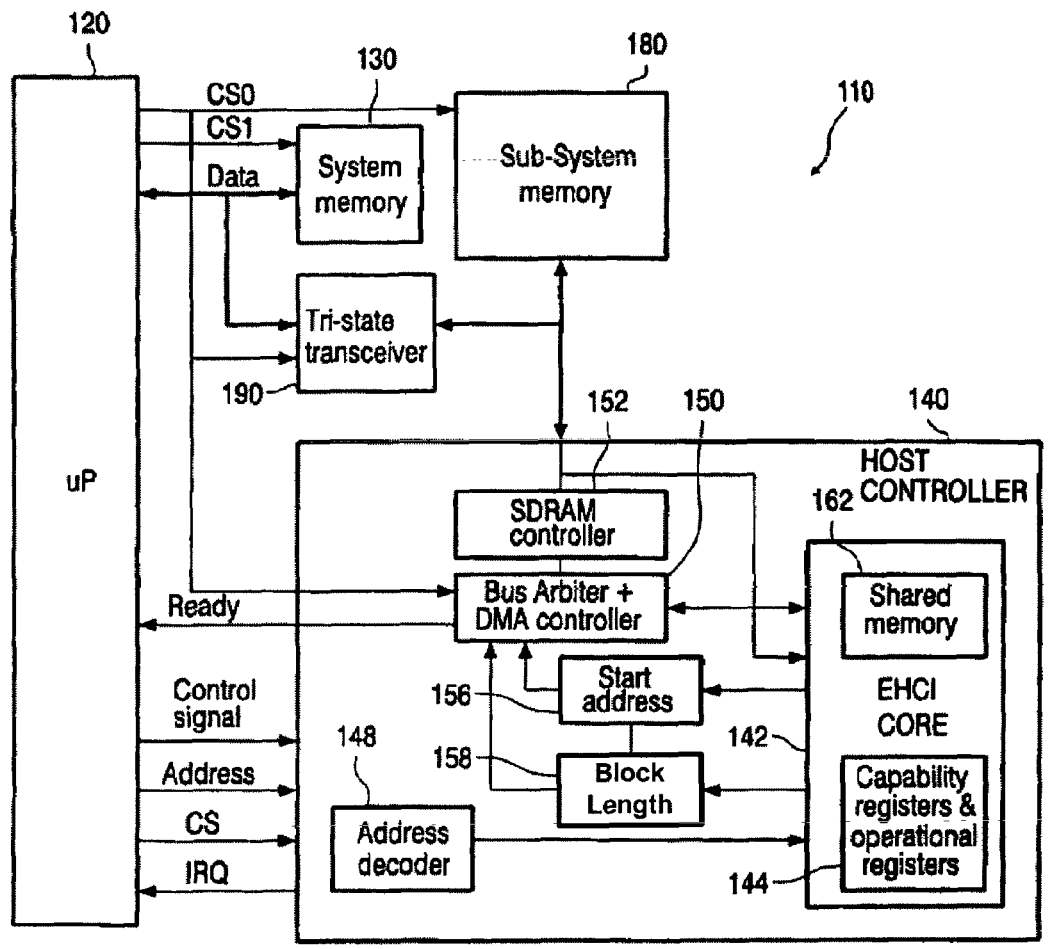
FIG. 2 is a block schematic diagram of a system including a second embedded host controller in accordance with the present invention.

Thus, FIG. 1 shows an architecture which is applicable in the case where the processor 20 provides a form of bus arbitration, allowing release of its data bus. By contrast, FIG. 2 shows an architecture which is applicable in the case where the processor does not provide bus arbitration.

The USB host 110 has a host processor 120, a system memory 130, and a host controller 140.

In this case, the processor 120 is of a type which does not allow bus arbitration. Features and functions of the processor 120 will not be described further herein, except insofar as they are relevant to an understanding of the present invention.

The memory 130 is a SDRAM bank, which again, is well known to the person skilled in the art.

As is conventional, the host controller, or embedded EHCI host, 140 is adapted to retrieve data which is prepared by the processor 120 in a suitable format, and to transmit the data over the bus interface. In USB communications, there are two categories of data transfer, namely asynchronous transfer and periodic transfer. Control and bulk data are transmitted using asynchronous transfer, and ISO and interrupt data are transmitted using periodic transfer. The Enhanced Host Controller Interface (EHCI) uses a Queue Transaction Descriptor (qTD) data structure for asynchronous transfer, and an Isochronous Transaction Descriptor (iTD) data structure for periodic transfer.

In this case, the USB host 110 further includes a sub-system memory 180. The processor 120 prepares the data in the appropriate structure, and stores it in the sub-system memory 180, and the host controller 140 must then retrieve the data from the sub-system memory 180.

This means that the software stack running on the processor 120 does not need to be changed significantly from the case in which the data is stored in the system memory 130, except that the data is directed instead to the sub-system memory 180.

FIG. 2 shows in more detail the structure of the host controller 140. The host controller 140 includes an EHCI core 142, which is generally conventional, and includes capability registers and operational registers 144, but will not be described further herein. The host controller 140 is connected to an address decoder 148, which is also generally conventional.

In accordance with the invention, the host controller 140 includes a DMA controller 150, which in FIG. 2 is shown in a single block with a bus arbiter.

The DMA controller 150 is connected to a SDRAM controller 152, and can be programmed with a start address 156 and a block length 158 by the EHCI core 142.

The EHCI core 42 of the host controller 40 uses the same transfer descriptors which are used in the conventional EHCI host controller, which retrieves data by mastering a PCI bus, and so the additional effort required to produce the EHCI core software is reduced.

The EHCI core 142 further includes a shared memory 162 in the form of a RAM.

Thus, when the host controller 140 initializes a transfer of data, a starting address and block length are sent from the core logic 142 to the DMA controller 150, which can initiate a burst data transfer from the sub-system memory 180 to the RAM 162, from which it can be transmitted over the USB bus interface.

Because it is possible that the processor 120 will access the sub-system memory 180 at the same time as the host controller 140 is accessing the sub-system memory 180, it is necessary to be able to resolve any contention.

When the host controller 140 is accessing the sub-system memory 180, the bus arbiter in the DMA controller 150 sends a Ready signal to the processor 120 to delay any attempt by the processor 120 to access the sub-system memory 180 until the host controller access is complete.

Further, an external data bus tri-state transceiver 190 is provided, connected between the host controller 140 the sub-system memory 180, and the system memory 130. When the processor 120 is not accessing the sub-system memory 180, the data bus transceiver 190 is tri-stated, and the host controller 140 accessing the sub-system memory 180 will not affect the system memory 130. This can be controlled by a combination of chip select and control signals from the processor 120.

Thus, FIG. 2 shows an architecture which requires an additional large sub-system memory, by comparison with the architecture of FIG. 1, but can be used with a wider range of processors, since it does not require the processor to support bus arbitration.

The invention claimed is:

1. An embedded host controller, for use in a USB system comprising a processor and an associated system memory coupled to the processor via a bus, the host controller comprising:
a DMA controller,
the host controller being adapted such that, in order to retrieve data from the associated system memory, a starting address and a block length are sent to the DMA controller, wherein the host controller comprises a programmable register, the programmable register being adapted to store a signal received from the processor indicating a maximum number of clock cycles for which the host controller can occupy the bus during a bus access, and
the DMA controller being adapted such that, on receipt of the starting address and the block length, the DMA controller retrieves the indicated data from the associated system memory.

2. An embedded host controller as claimed in claim 1, wherein the DMA controller is adapted to send a bus request to the processor, and to retrieve data from the associated system memory only when bus access has been granted.

3. An embedded host controller as claimed in claim 1, wherein the host controller is adapted to release the bus on expiry of the maximum number of clock cycles.

4. An embedded host controller as claimed in claim 1, wherein the associated system memory is a SDRAM, and the host controller comprises a SDRAM controller, the SDRAM controller being adapted to perform a refresh function if retrieval of the indicated data from the associated system memory takes longer than a refresh period of the SDRAM.

5. An embedded host controller as claimed in claim 1, wherein the DMA controller is adapted to send a signal to the processor while the DMA controller is retrieving data from the associated system memory, the signal to prevent the processor from simultaneously attempting to access the associated system memory.

6. A USB host, comprising:
a processor, wherein the processor is adapted to grant bus access on a bus;
a system memory, to which the processor writes USB data via the bus, wherein the associated system memory is a SDRAM; and
a host controller, the host controller comprising:
a DMA controller, and
the host controller being adapted such that, in order to retrieve data from the system memory, a starting address and a block length are sent to the DMA controller, and
the DMA controller being adapted such that, on receipt of the starting address and the block length, the DMA controller sends a bus request to the processor, and retrieves data from the system memory only when bus access has been granted, and
a SDRAM controller, the SDRAM controller being adapted to perform a refresh function if retrieval of the indicated data from the associated system memory takes longer than a refresh period of the SDRAM.

7. A USB host as claimed in claim 6, wherein the processor is adapted to send to the host controller a maximum duration signal indicating a maximum number of clock cycles for which the host controller can occupy the bus during a bus access, and wherein the host controller comprises a programmable register, the programmable register being adapted to store the maximum duration signal received from the processor.

8. A USB host as claimed in claim 7, wherein the host controller is adapted to release the bus on expiry of the maximum number of clock cycles.

9. A USB host, comprising:
a processor;
a system memory;
a sub-system memory, to which the processor writes USB data; and
a host controller, the host controller comprising:
a DMA controller, and
the host controller being adapted such that, in order to retrieve data from the sub-system memory, a starting address and a block length are sent to the DMA controller, and
the DMA controller being adapted such that, on receipt of the starting address and the block length, the DMA controller retrieves the indicated data from the sub-system memory,
the DMA controller being further adapted to send a signal to the processor while the DMA controller is retrieving data from the sub-system memory, the signal to prevent the processor from simultaneously attempting to access the sub-system memory.

10. A USB host as claimed in claim 9, wherein the DMA controller is adapted to send a signal to the processor while the DMA controller is retrieving data from the associated system memory, the signal to prevent the processor from simultaneously attempting to access the associated system memory.

11. A USB host as claimed in claim 9, wherein the signal comprises a ready signal from a bus arbiter in the DMA controller, the ready signal to delay an attempt by the processor to access the sub-system memory.

12. A USB host as claimed in claim 9, further comprising a tri-state transceiver coupled to the host controller and the sub-system memory, the tri-state transceiver to enter a tri-state mode when the processor is not accessing the sub-system memory.

13. A USB host as claimed in claim 9, wherein the DMA controller is adapted to retrieve the indicated data from the sub-system memory when the processor does not provide bus arbitration.

* * * * *